United States Patent
Jacob et al.

(10) Patent No.: US 12,442,848 B2
(45) Date of Patent: Oct. 14, 2025

(54) SYSTEM FOR POSITIONING ANTENNA ELEMENTS OF A DUT WITHIN A QUIET ZONE OF AN ANTENNA TEST CHAMBER

(71) Applicant: Keysight Technologies, Inc., Santa Rosa, CA (US)

(72) Inventors: Minu Jacob, Sunnyvale, CA (US); Gregory Douglas Vanwiggeren, San Jose, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 516 days.

(21) Appl. No.: 17/896,569

(22) Filed: Aug. 26, 2022

(65) Prior Publication Data
US 2024/0069082 A1 Feb. 29, 2024

(51) Int. Cl.
*G01R 29/08* (2006.01)
*H04B 17/00* (2015.01)

(52) U.S. Cl.
CPC ..... *G01R 29/0878* (2013.01); *H04B 17/0085* (2013.01)

(58) Field of Classification Search
CPC .. G01R 29/08; G01R 29/0892; G01R 29/105; G01R 29/0821; G01R 29/0878; G01R 29/10; H04B 17/0085; H04B 17/00; H04B 17/10; H04B 17/102
See application file for complete search history.

(56) References Cited

U.S. PATENT DOCUMENTS

| | | | |
|---|---|---|---|
| 10,122,085 B2 | 11/2018 | Goyette et al. | |
| 10,914,774 B2 | 2/2021 | Rowell et al. | |
| 11,381,325 B1 | 7/2022 | Gruber | |
| 2021/0364563 A1* | 11/2021 | Endo | H04B 17/0087 |
| 2022/0074866 A1* | 3/2022 | Tsai | H01L 21/67288 |
| 2023/0033833 A1* | 2/2023 | Maruo | G01R 29/105 |

FOREIGN PATENT DOCUMENTS

CN 112834833 A 5/2021

OTHER PUBLICATIONS

English translation of CN112834833A, 8 pgs.
Joseph Timothy Foley et al., "Low-cost Antenna Positioning System Designed with Axiomatic Design", MATEC Web of Conferences 127, 01015 (2017), pp. 1-7.
"Tailor-Made Antenna Measurement Systems" SMITEK, 2019, pp. 1-30.
Gregory F. Masters et al., "Coordinate System Plotting for Antenna Measurements", Computer Science, 2007, 1-10 pgs.

* cited by examiner

*Primary Examiner* — Tuan H Nguyen

(57) ABSTRACT

A system for testing a device-under-test (DUT) over-the air (OTA) includes a probe antenna, an azimuth positioner, a linear positioner and a roll positioner. The probe antenna measures radiated fields from the DUT and emits radiated fields to the DUT by illuminating active antenna elements of the DUT. The azimuth positioner rotates the DUT in a first plane about an azimuth axis. The linear positioner drives the DUT linearly along a first Y-axis in a second plane orthogonal to the first plane and drives the DUT linearly along a second X-axis perpendicular to the first Y-axis in the second plane to stay within a quiet zone of the system. The roll positioner is provided between the second plane and the azimuth positioner and is configured to rotate the DUT about a roll axis orthogonal to the azimuth axis.

20 Claims, 9 Drawing Sheets

Direct far-field system

SYSTEM FOR POSITIONING ANTENNA ELEMENTS OF A DUT WITHIN A QUIET ZONE OF AN ANTENNA TEST CHAMBER

BACKGROUND

An over-the-air (OTA) measurement system may include a probe antenna that measures radiated electromagnetic fields from a device-under-test (DUT) in a transmit test condition, and/or subjects the DUT to radiated electromagnetic fields in a receive test condition. To emulate real-world test conditions, the antenna elements in the DUT must be at a far-field distance from the probe antenna. In far-field conditions, the antenna elements of both the probe antenna and the DUT are subjected to flat wave fronts of electromagnetic fields in beams from the other of the DUT and the probe antenna. When far-field conditions are not met, the antenna elements of the probe antenna and the DUT are subjected to spherical wave fronts.

A direct far-field (DFF) system may directly expose the DUT to the probe antenna. To reduce the space required for testing, a compact antenna test range (CATR) may use a parabolic reflector to collimate and reflect a diverging beam from a probe antenna at the focus of the parabolic reflector. In either a direct DFF system or a CATR, the DUT is placed within a quiet zone to test the antenna elements of the DUT under far-field conditions. The quiet zone in any internal chamber is a test zone in which the wave fronts of electromagnetic fields from the probe antenna have near-ideal flatness within specified limits.

The size of the quiet zone in an OTA measurement system is determined by multiple factors. In a DFF test system, these factors include the width of the beam from the probe antenna and the distance between the DUT and the probe antenna. In a CATR setup, the size of the quiet zone is determined by the width of the beam from the probe antenna and the focal length and size of the parabolic reflector.

In either a DFF system or a CATR system, path loss in the path between the DUT and probe antenna increases with higher frequencies, though in a CATR system path loss is reduced after the beam is collimated and reflected from the parabolic reflector. CATR systems may also be designed to minimize the distance between the probe antenna and the reflector to minimize the path loss. In general, a larger quiet zone results in greater path loss due to the wider beams and larger propagation distances required to cover the quiet zone.

DUTs may be increasingly power constrained as the frequencies used by the DUTs increase. Device power is limited at high frequencies used in, for example, mm-wave and sub-terahertz (THz) OTA systems. With the use of increasingly higher frequencies such as mm-wave and sub-terahertz, OTA measurement systems increasingly use high-gain probe antennas with high directivity such that the beam is narrow since gain and beam width are inversely proportional. The narrower beam improves sensitivity in power measurements In addition to the shape of the wave phase front for beams from the probe antenna, the beam that falls on the DUT also has an amplitude characteristic that corresponds to a width of the beam and is based on the beam patterns of the beams from the probe antenna. The width of the beam is selected based on a balance between maximizing illumination coverage of a DUT while also maximizing gain and directivity of the beam for power-constrained DUTs. The wave front of the beam should fall on the DUT in the quiet zone of an OTA system, and is analogous to a spot which illuminates the DUT where the wave front of the beam falls. An inverse relationship exists between acceptable spot size and achievable magnitude of gain for a probe antenna that can be used without power constraints.

DUTs such as mobile phones have become larger over time, and some DUTs now have more than one antenna array to be tested. Each antenna array of these DUTs must be subject to testing. It is sometimes not practicable to use a beam with a wave front larger than the DUT or even large enough to illuminate even one antenna array of the DUT let alone some or all of multiple antenna arrays of the DUT. For high frequency beams such as for testing 5G or 6G DUTs, the width of the beam where the DUT is illuminated in the quiet zone of the OTA system may be smaller than the DUT and even smaller than an individual antenna array of the DUT. A smaller quiet zone that does not extend across the full extent of the radiating elements in a DUT may result in measurement errors in test parameters such as gain, total radiated power (TRP), equivalent isotropic radiated power (EIRP), side lobe levels and null depths. If the antenna elements are offset from the center of the DUT, and/or if the quiet zone is not large enough to cover the full extent of the DUT, measurement errors may result due to the radiating elements being outside of the quiet zone as the DUT is rotated on a DUT positioner.

What is needed, therefore, is a system for testing a DUT that overcomes at least the shortcomings of the systems noted above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
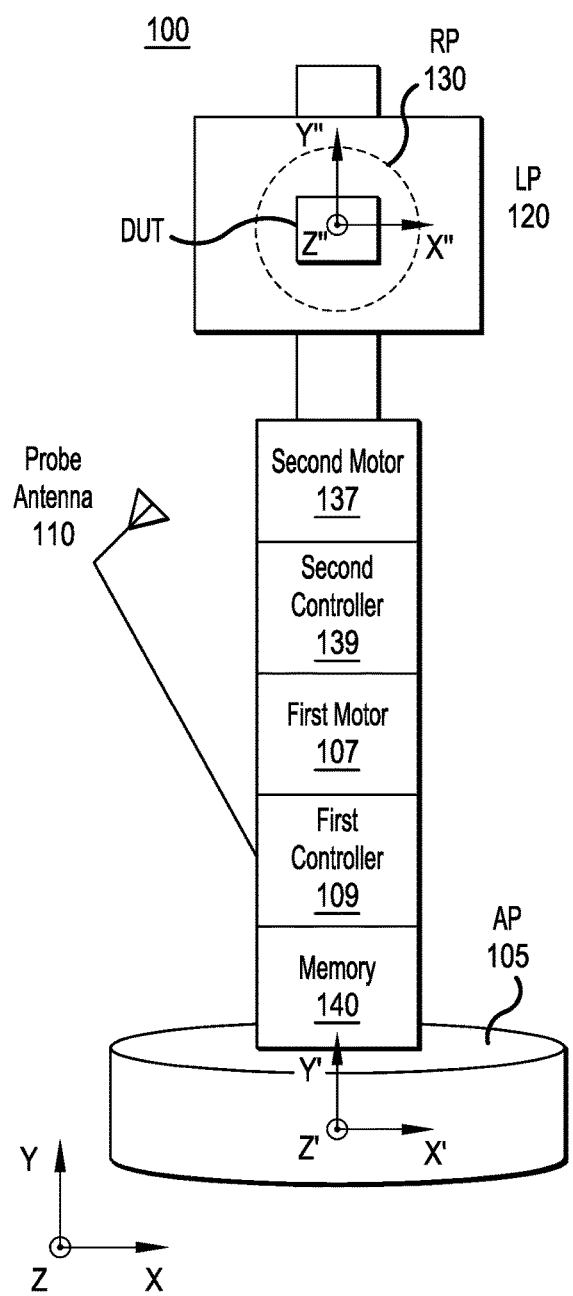
FIG. 1A illustrates a frontal view of a system for device-under-test (DUT) control, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a,' 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

The present disclosure, through one or more of its various aspects, embodiments and/or specific features or sub-components, is thus intended to bring out one or more of the advantages as specifically noted below.

As described herein, systems for device-under-test (DUT) control may reduce required sizes for quiet zones, such as for testing sub-terahertz and mm-wave devices OTA, using positioning configurations for dynamically positioning the DUTs in the systems. For a white box test condition, where locations of the active radiating antenna elements are known, the systems may center antenna arrays of DUTs within the quiet zone, such as when DUTs are larger than the quiet zones. The radiating elements of DUTs may be maintained within the small quiet zones as DUT positioners rotate the DUTs.

Beneficially, the device-under-test control provides a dynamic ability to maintain radiating elements of antenna arrays of DUTs within the illumination of electromagnetic fields of beams in a quiet zone of a far-field OTA measurement system using mechanisms described herein.

According to an aspect of the present disclosure, a system for testing a device-under-test (DUT) over-the air (OTA) comprises: a probe antenna configured to measure radiated fields from the DUT in a transmit test and to emit radiated fields to the DUT in a receive test by radiating electromagnetic waves upon active antenna elements of the DUT; a rotational positioner configured to rotate the DUT about one or more orthogonal axes; and a linear positioner configured to drive the DUT linearly along a first Y-axis (e.g., Y" axis described below) and configured to drive the DUT linearly along a second X-axis (e.g., X" axis described below) perpendicular to the first Y-axis to stay within a quiet zone of the system.

According to another aspect of the present disclosure, a system for testing a device-under-test (DUT) over-the air (OTA) is described. The system comprises: a probe antenna configured to measure radiated fields from the DUT in a transmit test and to emit radiated fields to the DUT in a receive test by radiating active antenna elements of the DUT; a probe antenna configured to radiate the active antenna elements of the DUT; a parabolic reflector configured to collimate a diverging beam from the probe antenna; a motor configured to adjust a pointing angle of the probe antenna while maintaining an aperture of the probe antenna at a focus of the parabolic reflector; and a controller configured to control motor to drive the movement of the probe antenna.

According to a further aspect of the present disclosure, method for testing a device-under-test (DUT) over-the air (OTA) is described. The method comprising: measuring radiated fields from the DUT in a transmit test; radiating radiated fields to the DUT in a receive test by illuminating active antenna elements of the DUT; rotating the DUT in a first plane about an azimuth axis; driving the DUT linearly along a first Y-axis in a second plane orthogonal to the first plane and the DUT linearly along a second X-axis perpendicular to the first Y-axis in the second plane, to stay within a quiet zone, and rotating the DUT about a roll axis orthogonal to the azimuth axis.

In the various representative embodiments described below, a controller (e.g., first and second controllers 109, 139) and a memory (e.g., memory 140) are described for controlling a motor (e.g., first and second motors 107, 137) to carry out the various aspects of the present teachings.

The memory (e.g., memory 140) may include a main memory and/or a static memory, where such memories may communicate with each other and a controller via one or more buses. The memory stores instructions used to implement some or all aspects of methods and processes described herein. The memory may be implemented by any number, type and combination of random access memory (RAM) and read-only memory (ROM), for example, and may store various types of information, such as software algorithms, which serves as instructions, which when executed by a processor cause the processor to perform various steps and methods according to the present teachings. Furthermore, updates to the methods and processes described herein may also be stored in memory.

The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 140 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory may store software instructions and/or computer readable code (collectively referred to as 'instructions') that enable performance of various functions of the systems described below. The memory may be secure and/or encrypted, or unsecure and/or unencrypted.

"Memory" is an example of computer-readable storage media, and should be interpreted as possibly being multiple memories or databases. The memory or database for instance may be multiple memories or databases local to the computer, and/or distributed amongst multiple computer systems or computing devices, or disposed in the 'cloud' according to known components and methods. A computer readable storage medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

The various controllers (e.g., first controller 109 and second controller 139) described below are representative of one or more processing devices, and is configured to execute software instructions stored in memory to perform functions as described in the various embodiments herein. The controllers comprise a processor that may be implemented by field programmable gate arrays (FPGAs), application specific integrated circuits (ASICs), systems on a chip (SOC), a general purpose computer, a central processing unit, a computer processor, a microprocessor, a graphics processing unit (GPU), a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Modules have software instructions to carry out the various functions using one or multiple processors that may be within the same computing device or which may be distributed across multiple computing devices.

FIG. 1A illustrates a frontal view of a system for device-under-test (DUT) control, in accordance with a representative embodiment.

The system 100 in FIG. 1A is an over-the-air (OTA) system for testing a device-under-test (DUT). The system 100 includes an azimuth positioner (AP) 105, a probe antenna 110, a first motor 107, a first controller 109, a linear positioner (LP) 120, a roll positioner (RP) 130, a second motor 137, a second controller 139, and a memory 140.

The azimuth positioner 105 in FIG. 1A supports the roll positioner 130, the linear positioner 120 and the DUT. The roll positioner 130 is disposed behind the linear positioner 120 (see FIG. 1B) and supports the linear positioner 120 and the DUT. The linear positioner 120 supports the DUT so that the DUT is movably positioned on the linear positioner 120. Notably, the DUT is typically fastened to fixtures (not shown) mounted on the linear positioner 120.

The azimuth positioner 105 is configured to rotate the roll positioner 130, the linear positioner 120 and the DUT parallel to a first plane and about an azimuth axis. The azimuth axis may be the axis of rotation of the azimuth positioner 105 in the vertical direction (Y-direction according to the coordinate systems of FIG. 1A). The first plane may be a plane defined by the X-axis and the Z-axis in FIG. 1A and FIG. 1B. In other words, the first plane may be parallel to a surface of the ground (X-Z plane of FIGS. 1A and 1B) or structure under the system 100 that supports the system 100. The azimuth axis may be a center of rotation of the azimuth positioner 105 and may run in the Y direction in FIG. 1A and FIG. 1B. The −Y direction for embodiments described in connection with FIGS. 1A and 1B may correspond to the direction of gravity. The azimuth positioner 105 is driven by the first motor 107, and the first motor is controlled by the first controller 109. The X'Y'Z' coordinate system of FIG. 1A moves/transforms with the rotation of the azimuth positioner 105 such that the fixed Y' axis is parallel to the Y-axis and denotes the azimuth axis of rotation, but the X' and Z' axes rotate about the Y' axis.

Figure 1B:
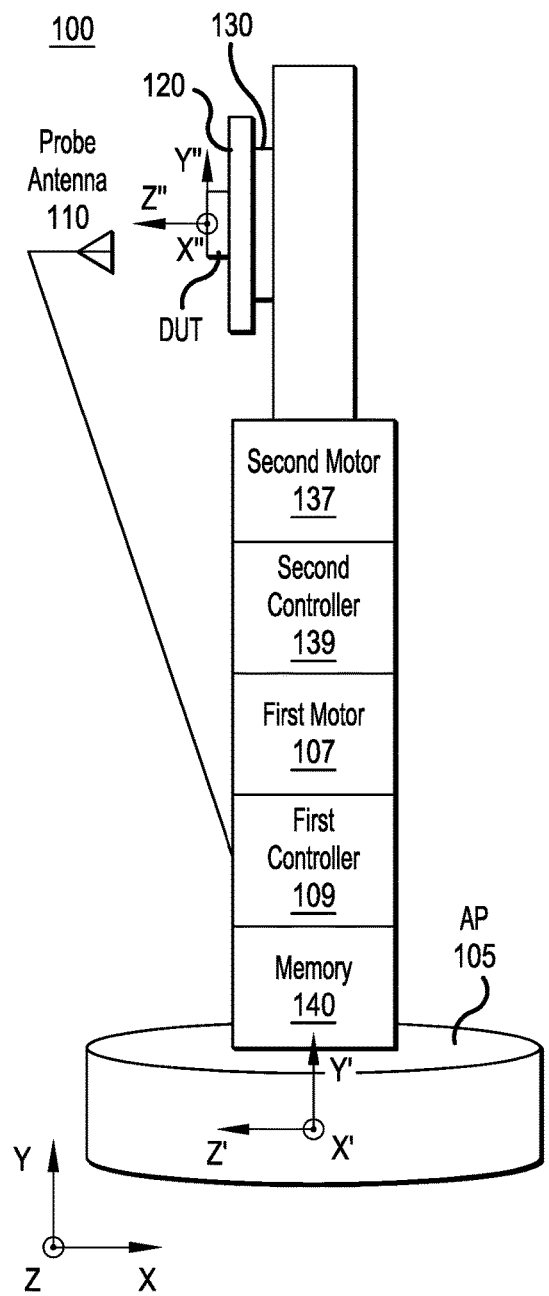
FIG. 1B illustrates a frontal view of the system for device-under-test (DUT) control in FIG. 1A, in accordance with a representative embodiment, where the azimuth positioner has rotated 90 degrees from the orientation in FIG. 1A.
Figure 4A:
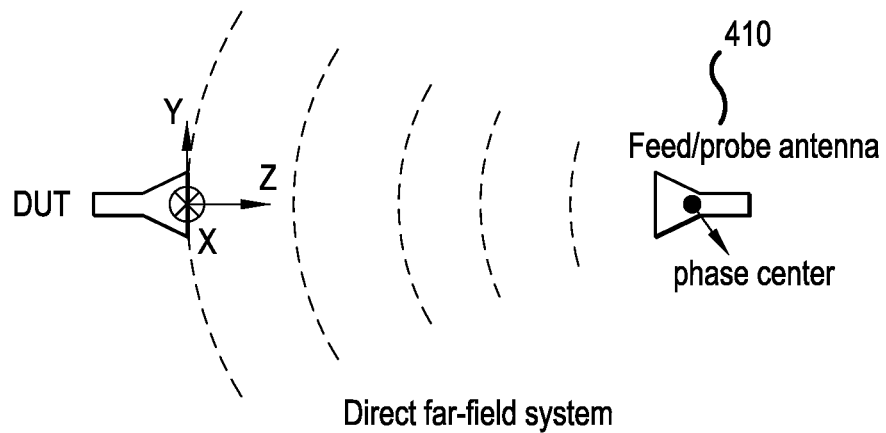
FIG. 4A illustrates a direct far-field system for a system for device-under-test (DUT) measurements, in accordance with a representative embodiment.
Figure 4B:
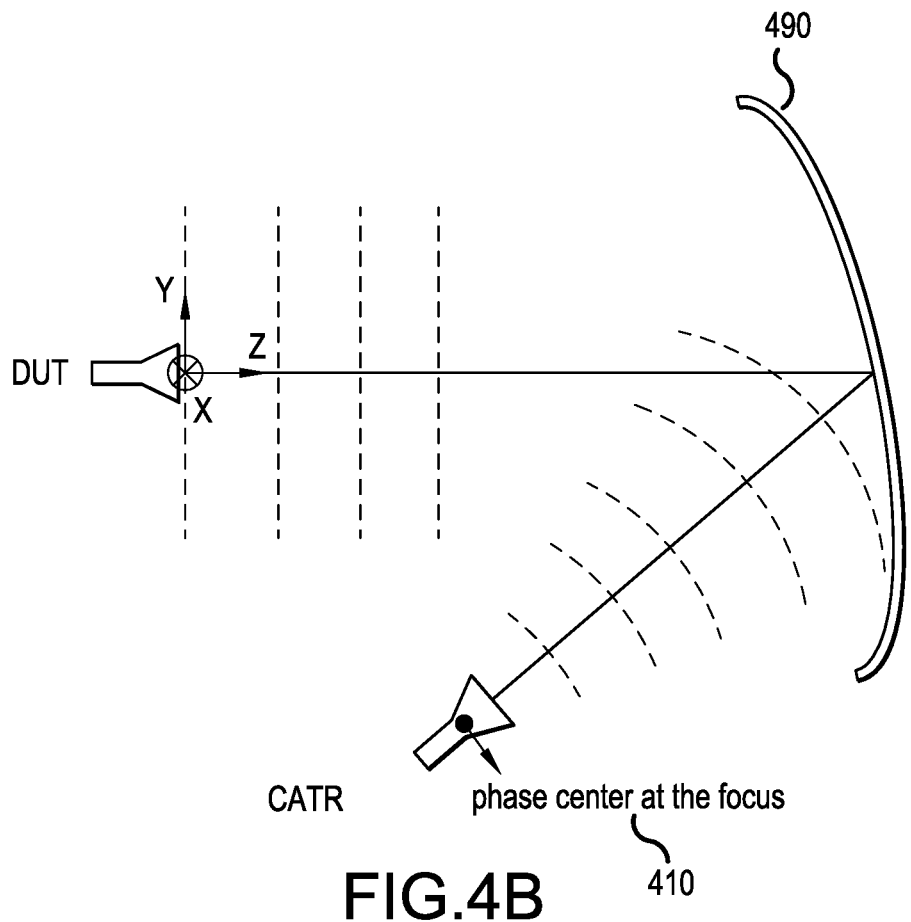
FIG. 4B illustrates a compact antenna test range (CATR) for a system for device-under-test (DUT) measurements, in accordance with a representative embodiment.

The probe antenna 110 is configured to measure radiated fields from the DUT in a transmit test and to emit radiated fields to the DUT in a receive test by radiating active antenna elements of an antenna array of the DUT. To avoid obscuring other features in FIG. 1A, the probe antenna in FIG. 1A is shown offset to the azimuth positioner 105, the roll positioner 130, the linear positioner 120 and the DUT in FIG. 1A. However, in operation the probe antenna 110 may be arranged adjacent to (directly in front of) the DUT in a system as shown in FIGS. 1B and 1n FIG. 4A. In a compact antenna test range (CATR) application, the probe antenna 110 may be arranged offset to an intervening parabolic reflector such as shown in FIG. 4B and in FIG. 7.

The first motor 107 is illustratively a known precision stepper motor, or a servo motor ('servo') or a direct drive motor. The first motor 107 is configured to drive rotation of the azimuth positioner 105. The first motor 107 is controlled by the first controller 109. The first motor 107 may be an electric motor.

As described more fully below, the first controller 109 is configured to control the first motor 107 to drive rotation of the azimuth positioner 105. As an example, the first controller 109 may include at least a memory that stores instructions and a processor that executes the instructions to control the first motor 107 systematically in a test pattern. The first controller 109 may control the first motor 107 to drive rotation of the azimuth positioner 105 in accordance with a test plan by executing software instructions stored in the memory 140.

The linear positioner 120 is configured to drive the DUT to stay within a quiet zone of the system 100. As described more fully below, the linear positioner 120 is configured to drive the DUT linearly along a first axis (e.g., X-direction in the coordinate system of FIG. 1A and FIG. 1B) in a second plane perpendicular to the first plane (e.g., Y-Z plane in the coordinate system of FIG. 1A and FIG. 1B, as well as linearly along a second axis (e.g., Y-direction in the coordinate system of FIG. 1A and FIG. 1B) perpendicular to the first axis and in the second plane. The linear positioner 120 may include separate mechanisms to drive and steer the DUT along the first axis and the second axis. For example, the linear positioner 120 may include one or more first gears and/or shafts to drive the DUT along the first axis and one or more second gears and/or shafts to drive the DUT along the second axis.

The linear positioner 120 may operate without moving the azimuth positioner 105 or other elements of the system 100 in FIG. 1A and FIG. 1B while driving the DUT. The first axis may be the X"-axis and the second axis may be the Y"-axis shown in FIG. 1A and FIG. 1B. The first axis and the second axis are not necessarily always in a traditional X" (horizontal direction) and a traditional Y" (vertical direction), and instead may be offset from the traditional X"-direction and Y"-direction while still being coplanar and perpendicular to one another, such as when the linear positioner 120 and the DUT are being rolled by the roll positioner 130. The linear positioner 120 may be configured to linearly drive the DUT in one direction such as the X"-direction or Y"-direction at one time, and then drive the DUT in another direction such as the Y"-direction or X"-direction at another time.

The second motor 137 may be configured to drive the linear positioner 120, and is controlled by the second controller 139. Like first motor 107, second motor 137 is illustratively a known precision stepper motor, or a servo motor ('servo'), or a direct drive motor. Alternatively, the second motor 137 may be a manual linear stage. The second motor 137 may be a stepper motor, which is controlled by the second controller 139 upon execution of instructions stored in memory 140. The linear positioner 120 may be driven by the second motor 137 so as to move the DUT to one or more specific measurement positions. The second controller 139 may be configured to control the second motor 137 to drive the linear positioner 120. As an example, the second controller 139 may include at least a memory that stores instructions and a processor that executes the instructions to control the second motor 137 systematically in a test pattern. The second controller 139 may control the second motor 137 to drive the linear positioner 120 linearly along the first axis and linearly along the second axis in accordance with a test plan by executing software instructions stored in the memory 140.

Notably, the first and second controllers 109, 139 can be replaced by a single/master controller; and the first and second motors 107, 137 can be replaced by a single motor. The single/master controller is adapted to control one or more motors to drive positioners in accordance with a test plan by executing software instructions stored in the memory 140.

In some embodiments, the linear positioner 120 may be driven by the second motor 137 under the control of the first controller 109, so that the second controller 139 may be omitted. In other embodiments, the linear positioner 120 may be driven by the first motor 107 under the controller of the first controller 109, so that both the second motor 137 and the second controller 139 may be omitted. That is, one or more than one motor may be used in embodiments based on FIG. 1A and FIG. 1B, and one or more than one controller may be used in embodiments based on FIG. 1A and FIG. 1B. Alternatively, in accordance with a representative embodiment, the various positioners are controlled by a dedicated controller, although, as noted above, one controller could be used to control all positioners and motors.

Figure 2C:
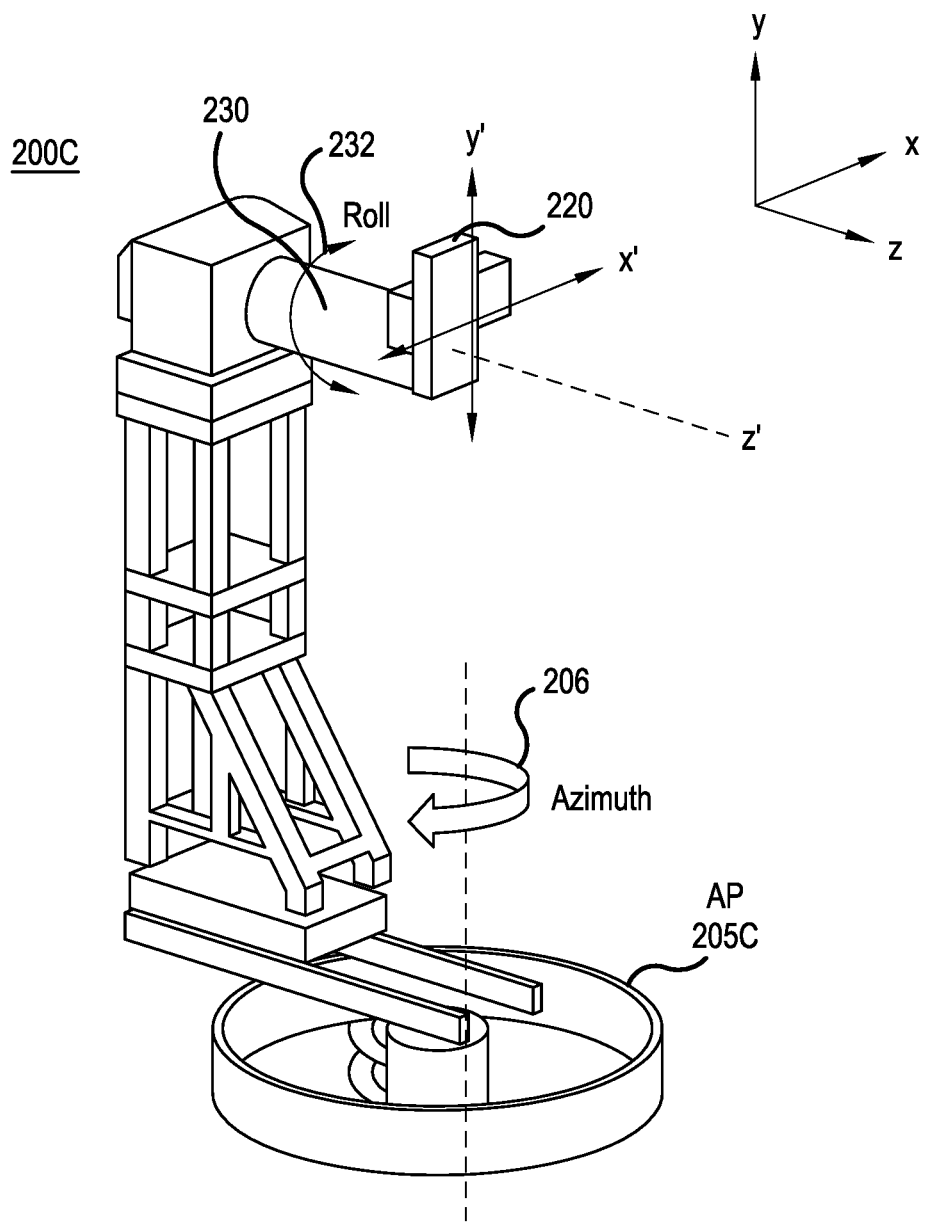
FIG. 2C illustrates an equivalent system to the XY-over-roll-over-azimuth DUT positioner in FIG. 2B, in accordance with a representative embodiment.
Figure 3:
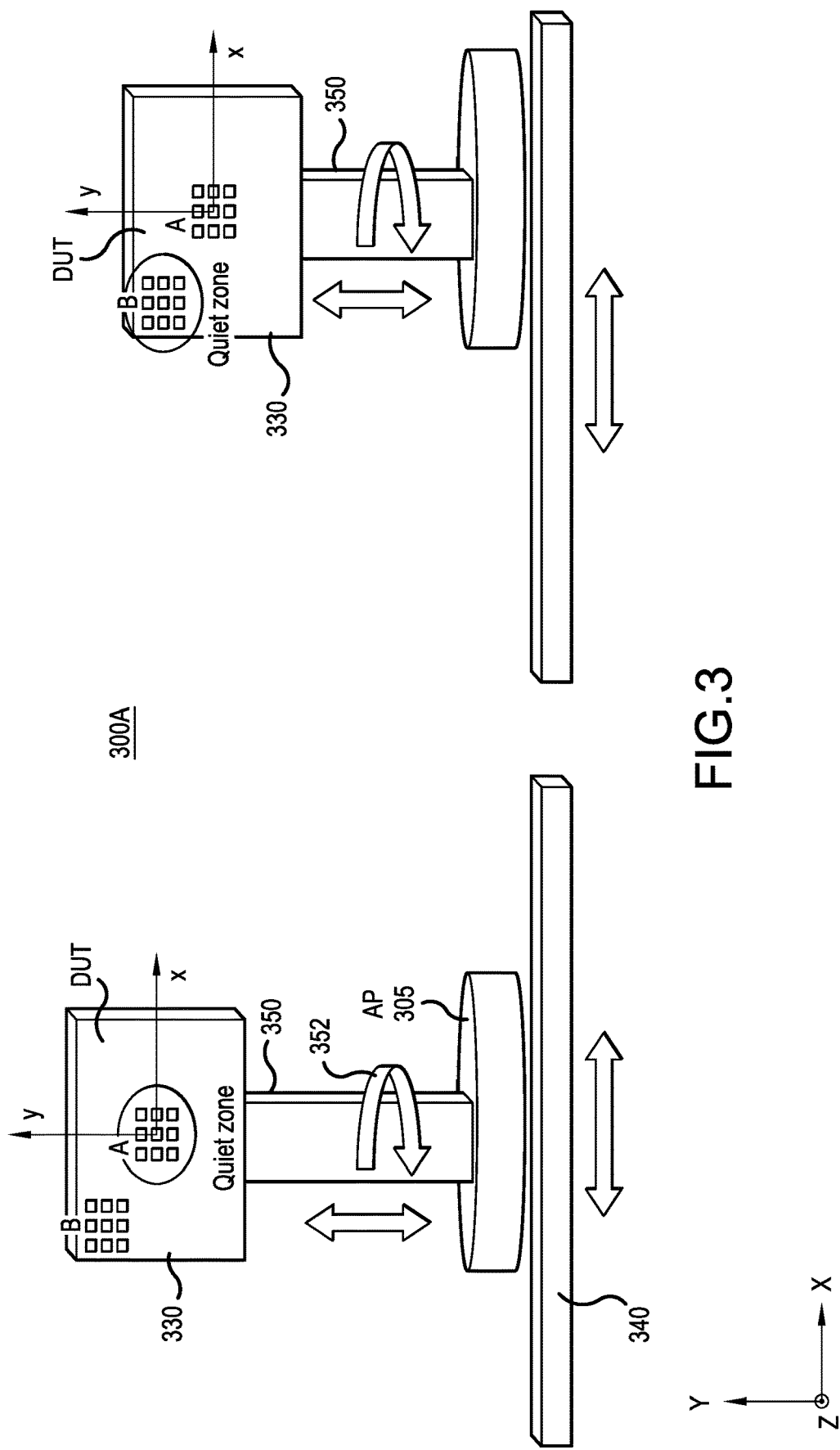
FIG. 3 illustrates a test system with separated linear positioners for device-under-test (DUT) control, in accordance with a representative embodiment.

The roll positioner 130 in FIG. 1A and FIG. 1B is disposed between the azimuth positioner 105 and the linear positioner 120. In embodiments described herein, the roll positioner 130 may be provided between the azimuth positioner 105 and the second plane in which the linear positioner 120 linearly drives the DUT, even when the roll positioner 130 is not strictly between the azimuth positioner 105 and the linear positioner 120. The roll positioner 130 may roll about a second roll axis that is orthogonal to the azimuth axis. Moreover, as shown in FIGS. 2C and 3, the second roll axis described herein is the axis of the roll positioner 130. The second roll axis is in the Z" direction in the coordinate system shown in FIG. 1A and FIG. 1B, and may be a rotational center of the roll positioner 130.

The roll positioner 130 may be driven by a third motor (not shown), the second motor 137 or the first motor 107. The motor that drives the roll positioner 130 may be controlled by a third controller (not shown), the second controller 139 or the first controller 109. Like other motors described above, the third motor is illustratively a known precision stepper motor, or a servo motor ('servo') or a direct drive motor.

The DUT may be a mobile device with one, two, or more than two antenna arrays. The DUT may be, for example, a smart phone, a tablet computer, or another computer or device configured to communicate over broadband cellular networks such as a 5G network or, in the future, a 6G network. The system 100 is configured to test wireless capabilities of the DUT by measuring radiated fields from the DUT in the transmit test and emitting radiated fields to the DUT in the receive test.

In FIG. 1A, the system 100 keeps the probe antenna 110 fixed while the DUT is rotated around a sphere. The probe antenna 110 may sample the pattern of the DUT across the sphere. The DUT is rotated about the azimuth axis in the first plane by the azimuth positioner 105 and about the axis of rotation of roll positioner 130 (see also FIGS. 2C and 3) and is driven linearly along the first axis and/or the second axis by the linear positioner 120.

In operation, the system 100 may maintain the DUT within the quiet zone of the system 100 at the intersection of the first azimuth and the second roll while a test plan is implemented.

FIG. 1B illustrates a profile view of the system for device-under-test (DUT) control in FIG. 1A, in accordance with a representative embodiment. Various aspects and details of the system shown in FIG. 1B are common to those described in connection with the representative embodiments of FIG. 1A, and may not be repeated to avoid obscuring the present description of the representative embodiments of FIG. 1B.

As shown in FIG. 1B, the DUT is positioned on the linear positioner 120, and the linear positioner 120 is positioned on the roll positioner 130. The roll positioner 130 is positioned on an element of the azimuth positioner 105. As a result, the DUT, the linear positioner 120, the roll positioner 130 and the azimuth positioner 105 are arranged in order in the Y direction of the coordinate system of FIG. 1B.

Although the linear positioner 120 in FIG. 1A and FIG. 1B is shown as a singular element, the linear positioner 120 may include a first linear positioner (not shown) and a second linear positioner (not shown) that operate or are operated independently. For example, a first linear positioner may comprise a first drive shaft that is driven by a first gear or a first threaded screw to move the DUT in the X" direction, and the second linear positioner may comprise a second drive shaft that is driven by a second gear or a second threaded screw to move the DUT in the Y" direction. The first linear positioner and the second linear positioner of the linear positioner 120 may be driven by separate motors, and such separate motors may be separately controlled by separate controllers.

Among other benefits, the system 100 of FIG. 1A and FIG. 1B enables a reduction in size of a quiet zone so that fewer than all antenna elements in the DUT may be radiated at any one time. The antenna elements of the DUT radiated by the beam from the probe antenna 110 at any one time may include active antenna elements without including at least some inactive antenna elements. Beneficially, the reduction in the needed number of antenna elements accorded by the present teachings allows the radiation over the comparatively smaller active DUT area to have greater power density while minimizing wasted illumination on the non-active DUT elements. The higher power density in the smaller test zone enables larger dynamic range in measurements for power-constrained DUTs. The smaller quiet zone results in a reduced path loss for signals from the probe antenna 110 to the DUT and from the DUT to the probe antenna 110. The reduction in path loss results from the reduced width of the beam from the probe antenna 110. The beam width of the probe antenna 110 may be chosen to irradiate a DUT with a beam front of a defined size. The system 100 enables manipulation of the DUT so that the system 100 may center active elements of the antenna array of the DUT within the quiet zone of the system 100, even as the DUT is manipulated.

Figure 2A:
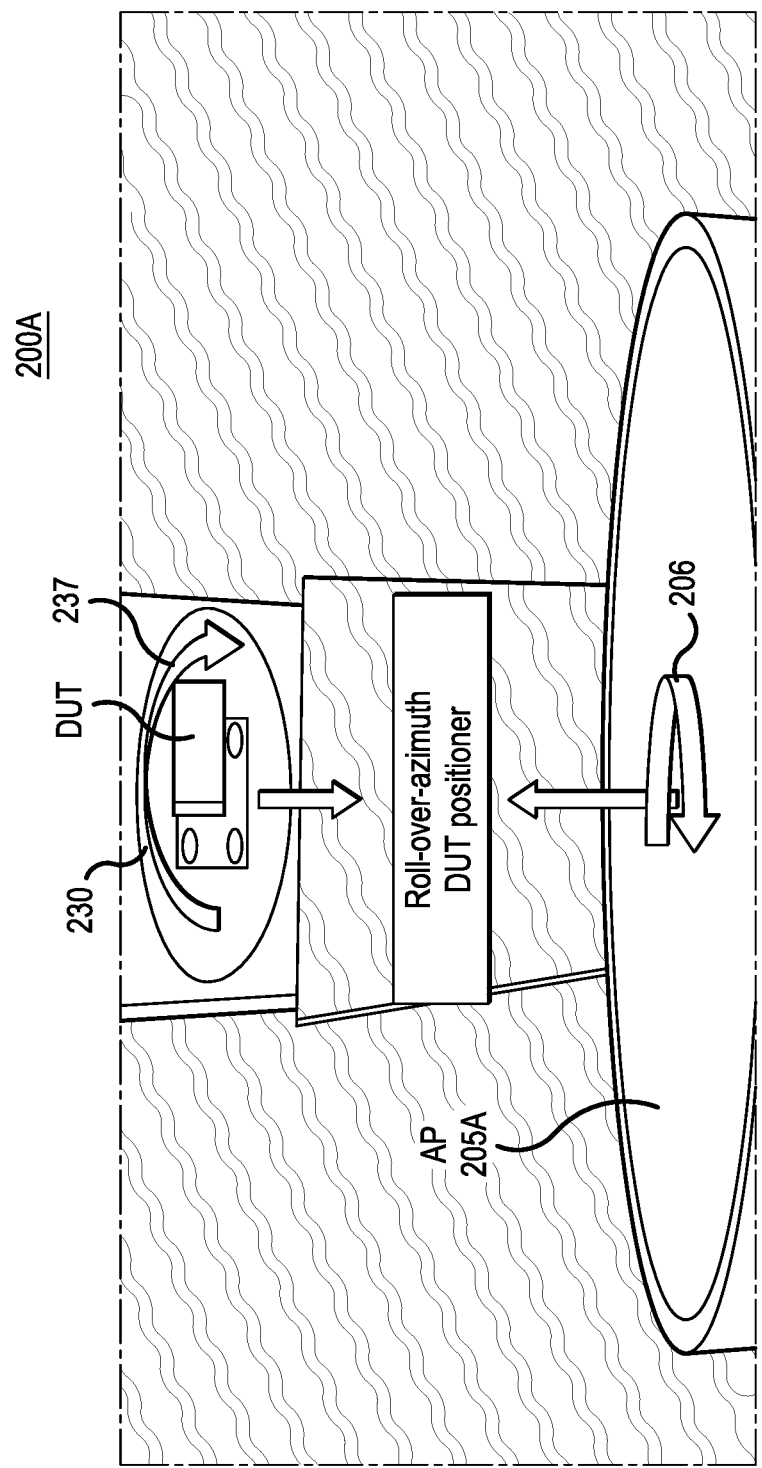
FIG. 2A illustrates a roll-over-azimuth DUT positioner for a system for device-under-test (DUT) control, in accordance with a representative embodiment.

FIG. 2A illustrates a roll-over-azimuth DUT positioner for a system for device-under-test (DUT) control, in accordance with a representative embodiment. Various details and aspects of the DUT positioner of FIG. 2A are common to the representative embodiments of FIGS. 1A-1B, and may not be repeated to avoid obscuring the description of the presently described representative embodiments.

The system 200A is a roll-over-azimuth DUT positioner system. The system 200A includes an azimuth positioner 205A and a roll positioner 230 that are adapted for testing the DUT.

Movement of the azimuth positioner 205A and roll positioner 230 described below may be effected by a motor controlled by a controller through the execution of instructions stored in a memory. Many aspects and details of the motor, the controller and the memory contemplated for use in connection with representative embodiments described in connection with FIGS. 1A-1B. These common aspects and details are generally not repeated to avoid obscuring the presently described representative embodiments.

In FIG. 2A, as shown by arrows of movement, an azimuth positioner 205A is configured to rotate about a vertical azimuth axis (Y-axis in the coordinate axis of FIG. 2A—shown by arrow 206) such as the azimuth described in connection with representative embodiments described in connection FIG. 1A and FIG. 1B. The azimuth positioner 205A supports the roll positioner 230 and the DUT. The azimuth positioner 205A may be driven by a first motor such as the first motor 107 in FIG. 1A and FIG. 1B, and the first motor may be controlled by a controller such as the first controller 109 in FIG. 1A and FIG. 1B.

The roll positioner 230 is configured to rotate about a horizontal roll axis (Z-axis—shown by arrow 231) such as the second roll axis in embodiments based on FIG. 1A and FIG. 1B. The second roll axis may comprise an axis of the roll positioner 230 in the Z direction into and out of the page. The roll positioner 230 is configured to drive rotation of the DUT in a plane formed by the X-axis and the Y-axis in FIG. 2A. The roll positioner 230 may be driven by a second motor such as the second motor 137 in FIG. 1A and FIG. 1B, and the second motor may be controlled by a controller such as the second controller 139 in FIG. 1A and FIG. 1B.

Figure 2B:
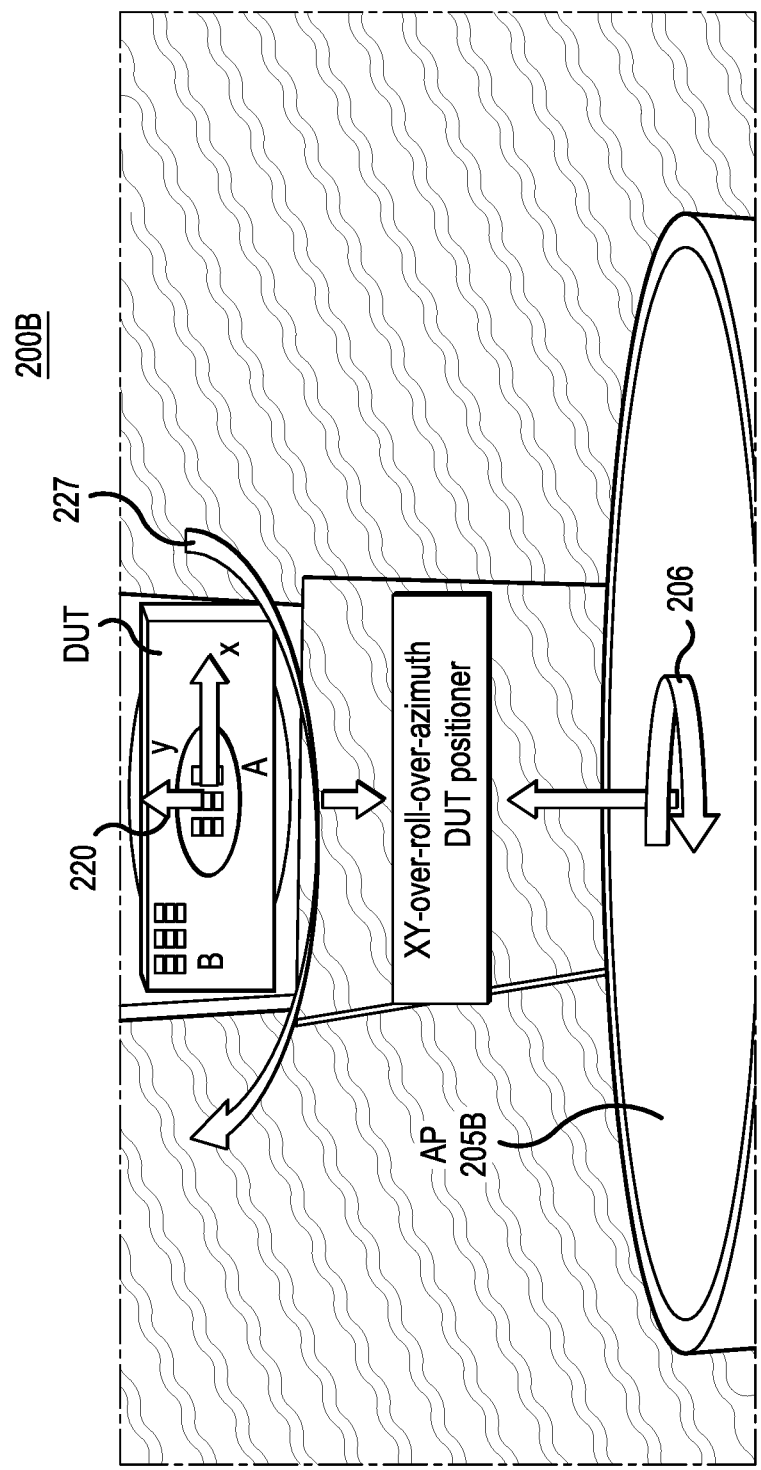
FIG. 2B illustrates an XY-over-roll-over-azimuth DUT positioner for a system for device-under-test (DUT) control, in accordance with a representative embodiment.
Figure 5:
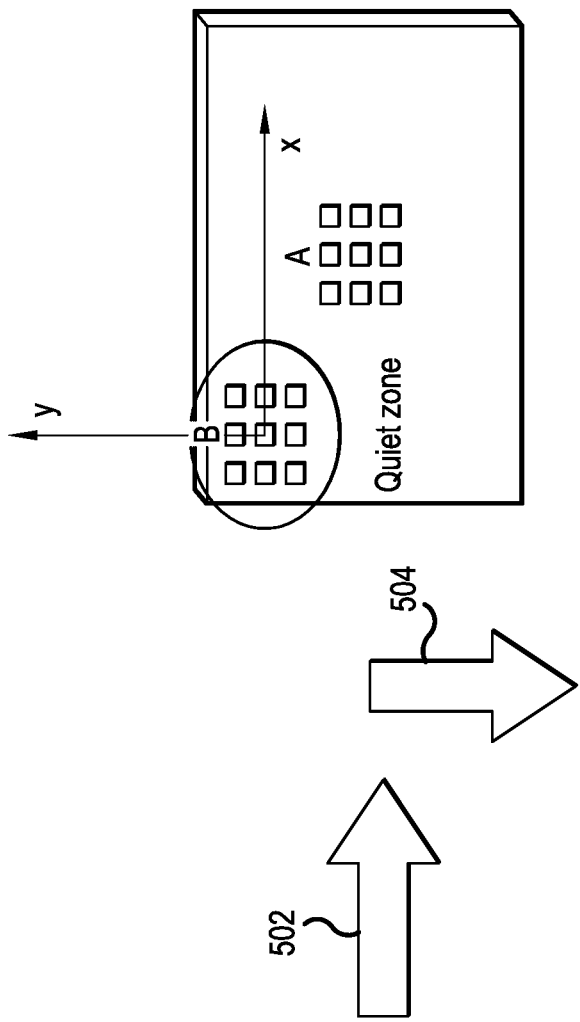
FIG. 5 illustrates switching between DUT antenna arrays in a system for device-under-test (DUT) control, in accordance with a representative embodiment.
Figure 5:
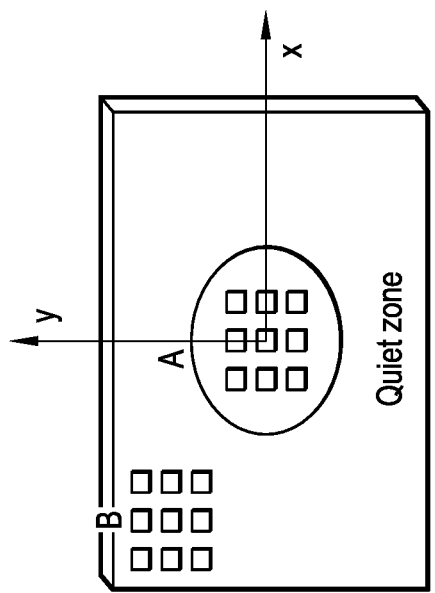

In FIG. 2A, the DUT may have a first antenna array A and a second antenna array B, as shown in FIG. 2B, FIG. 3 and FIG. 5. The quiet zone of the system 200A may only be large enough to cover the first antenna array A or the second antenna array of the DUT. In such a system, as the DUT is rotated around the azimuth axis or the roll axis during the test sequence, antenna array A or antenna array B will move out of the quiet zone unless either array is centered at the center of rotation of both the azimuth and roll positioners.

FIG. 2B illustrates an XY-over-roll-over-azimuth DUT positioner for a system 200B for device-under-test (DUT) control, in accordance with a representative embodiment. Various details and aspects of the DUT positioner of FIG. 2B are common to the representative embodiments of FIGS. 1A-2A, and may not be repeated to avoid obscuring the description of the presently described representative embodiments.

The system 200B includes an azimuth positioner 205B, a roll stage (not shown) and a linear positioner 220. The system 200B may also include one or more motor(s) and controller(s) to drive the azimuth positioner 205B, the roll stage and the linear positioner 220.

The azimuth positioner 205B and linear positioner 220 may be driven by a motor controlled by a controller by execution of instructions stored in a memory. Many aspects and details of the motor, the controller and the memory contemplated for use in connection with representative embodiments described in connection with FIGS. 1A-2A. These common aspects and details are generally not repeated to avoid obscuring the presently described representative embodiments.

In FIG. 2B, the azimuth positioner 205B is configured to rotate (shown by arrow 206) about a vertical azimuth axis (Y-axis in the coordinate system of FIG. 2B). The azimuth positioner 205B supports the roll stage, the linear positioner 220 and the DUT so that the roll stage, the linear positioner 220 and the DUT rotate with the azimuth positioner 205B. The roll stage may be similar or identical to the roll positioner 130 in FIG. 1A and FIG. 1B and/or the roll positioner 230 in FIG. 2A. The roll stage may be configured to rotate (shown by arrow 227) about an axis in the Z direction so as to roll the linear positioner 220 and the DUT. In FIG. 2B, the DUT may be offset in X and Y directions so that the first antenna array A and the second antenna array B may be variably centered within the quiet zone by linear positioning using the linear positioner 220.

The linear positioner 220 may correspond to the linear positioner 120 in FIG. 1A and FIG. 1B. The linear positioner 220 is configured to linearly drive the DUT in a plane formed by the X-axis and the Y-axis of the coordinate system of FIG. 2B. The linear positioner 220 is configured to drive the DUT in the X direction and, separately, in the Y direction. In FIG. 2B, the linear positioner 220 may be a dual-axis linear XY positioner added above the roll stage. The linear positioner 220 may operate without moving the azimuth positioner 205B or other elements of FIG. 2B with the exception of the DUT. The linear positioner 220 may be driven by a motor, such as one of the motors described above. The roll positioner may be capable of handling the additional weight of the linear positioner 220 as well as the weight of the DUT.

The DUT in FIG. 2B may have a first antenna array A and a second antenna array B. The linear positioner 220 is configured to drive the DUT to center first active elements of the first antenna array A of the DUT within a quiet zone of the system 200B at a first time and second active elements of the second antenna array B of the DUT within the quiet zone of the system 200B at a second time. In other words, the first antenna array A and the second antenna array B may be independently tested using the system 200B in FIG. 2B by linearly driving the DUT so as to reposition the DUT to re-center the first antenna array A and the second antenna array B for separate testing.

The manufacturers of the DUT may provide the system 200B with information as to the location of each antenna array of the DUT. A high-gain probe antenna may separately illuminate each antenna array at different times in a relatively-small quiet zone. The antenna array being subject to the testing is maintained within the quiet zone through all degrees of rotation by the system 200B. The DUT is maintained in the spot at the center of the quiet zone while the sphere is rotated about the first azimuth 360 degrees and the roll stage is rotated about the second roll axis. When another antenna array on the same DUT is to be tested, the DUT is moved so that the other antenna array is at the center of the quiet zone and then the sampling may be repeated at each position on the sphere. Each antenna array may be maintained at the center of rotation of the first azimuth and the second roll positioners in the system 200B while the sampling is performed through all degrees of rotation.

Beneficially, the system 200B in FIG. 2B enables a reduction in size of the quiet zone so that less than all antenna elements in the DUT may be illuminated at any one time, and so that the illuminated antenna elements may include active antenna elements of antenna arrays of the DUT without including at least some inactive antenna elements of the DUT at any one time. The smaller quiet zone results in a reduced path loss due to the smaller beam width required to irradiate the quiet zone. As noted above, the reduction in the needed number of antenna elements accorded by the present teachings allows the irradiation of electromagnetic signals on the smaller active DUT area to have greater power density while minimizing wasted irradiation on the non-active DUT elements. The higher power density in the smaller test zone enables larger dynamic range in measurements for power-constrained DUTs. Moreover, mounting the roll positioner 230 over the roll stage in FIG. 2B enables center of rotation about the offset antenna array of a DUT to be maintained during testing of the DUT. Additionally, the beam width of the probe antenna used in the system 200B may be chosen to illuminate the DUT with a beam front of a defined size. The system 200B enables manipulation of the DUT so that the system 200B may center active elements of the antenna array of the DUT within the quiet zone of the system 200B, even as the DUT is manipulated.

In FIG. 2B, the system 200B maintains a probe antenna in a fixed position while the DUT is rotated around a sphere. The probe antenna of the system 200B may sample the pattern of the DUT across the sphere. As an example, the DUT may be placed on the azimuth positioner 205B to sample the DUT at each longitude and every longitude on the sphere as the sphere is moved. The manufacture of the DUT may provide the system 200B with information as to the location of each antenna array of the DUT. A high-gain probe antenna may illuminate the antenna array in a relatively-small quiet zone. The antenna array is maintained within the quiet zone through all degrees of rotation. The DUT is maintained in the spot at the center of the quiet zone while the sphere is rotated on the azimuth 360 degrees. When another antenna array on the same DUT is to be tested, the DUT is moved so that the other antenna array is at the center of the quiet zone and then the sampling may be repeated at each position on the sphere. Each antenna array may be maintained at the center of rotation of the first azimuth and the second roll axis in the positioner while the sampling is performed through all degrees of rotation.

FIG. 2C illustrates an equivalent system to the XY-over-roll-over-azimuth DUT positioner in FIG. 2B, in accordance with a representative embodiment. Various details and aspects of the DUT positioner of FIG. 2C are common to the representative embodiments of FIGS. 1A-2B, and may not be repeated to avoid obscuring the description of the presently described representative embodiments.

In FIG. 2C, the equivalent system 200C includes the azimuth positioner 205C, the linear positioner 220 and the roll positioner 230. Movement of the azimuth positioner 205C, linear positioner 220 and roll positioner 230 may be effected by a motor controlled by a controller through the execution of instructions stored in a memory. Many aspects and details of the motor, the controller and the memory contemplated for use in connection with representative embodiments described in connection with FIGS. 1A-2B. These common aspects and details are generally not repeated to avoid obscuring the presently described representative embodiments.

As shown in FIG. 2C, the azimuth positioner 205C rotates (shown by arrow 206) about an azimuth in the center of the azimuth positioner 205C. The azimuth in the center of the azimuth positioner 205C is oriented in the Y direction of the coordinate system of FIG. 2C. The rotation driven by the azimuth positioner 205C may be in a first plane (X-Z plane of the coordinate system of FIG. 2C) that is perpendicular to the azimuth of the azimuth positioner 205C, and the first plane may be a horizontal plane parallel to the ground or other base surface.

The linear positioner 220 in FIG. 2C is configured to drive a DUT in the X direction and in the Y direction perpendicular to the X direction. The linear positioner 220 may drive the DUT in a second plane defined by the X direction and the Y direction, and perpendicular to the first plane.

The roll positioner 230 is configured to roll (in the direction of arrow 232) the linear positioner 220 and the DUT about a roll axis (Z-axis of the coordinate system of FIG. 2C) at the center of the roll positioner 230. The second roll axis in the center of the roll positioner 230 may extend in a Z direction orthogonal to the second plane. The roll positioner 230 may extend from the azimuth positioner 205C so as to maintain the DUT in a centralized space at and near the center of rotation of the azimuth positioner 205C.

Finally, the present teachings contemplate rotation about the X-axis of the coordinate system of FIG. 2B. This axis may be to as the elevation axis adding another degree of freedom of the movement of the DUT during testing.

FIG. 3 illustrates a test system with separated linear positioners for device-under-test (DUT) control, in accordance with a representative embodiment. Various details and aspects of the test system of FIG. 3A are common to the representative embodiments of FIGS. 1A-2C, and may not be repeated to avoid obscuring the description of the presently described representative embodiments.

In FIG. 3, the system 300A includes an azimuth positioner 305, a roll positioner (not shown in FIG. 3) behind the DUT, a horizontal stage 340 and a vertical stage 350.

The azimuth positioner 305 is configured to rotate about a vertical azimuth which may be considered a first azimuth. The azimuth positioner 305 may comprise the azimuth positioner 105 in FIG. 1A and FIG. 1B, the azimuth positioner 205A in FIG. 2A or the azimuth positioner 205B in FIG. 2B.

The roll positioner 330 is configured to rotate about a horizontal second roll axis. The roll positioner 330 may comprise the roll positioner 130 in FIG. 1A and FIG. 1B, the roll positioner 230 in FIG. 2A or the roll stage (not shown) in FIG. 2B.

Movement of the azimuth positioner 305 and roll positioner 330 may be effected by a motor controlled by a controller through execution of instructions stored in a memory. Many aspects and details of the motor, the controller and the memory contemplated for use in connection with representative embodiments described in connection with FIGS. 1A-2C. These common aspects and details are generally not repeated to avoid obscuring the presently described representative embodiments.

In FIG. 3, the linear positioner from previous embodiments is replaced by the horizontal stage 340 and the vertical stage 350. The horizontal stage 340 and the vertical stage 350 may be provided partially or fully above or below a roll positioner 330. Additionally, the vertical stage 350 replaces a fixed translation member of the azimuth positioners in previous embodiments. The vertical stage 350 may be adjustable in the Y direction in FIG. 3A.

The horizontal stage 340 is provided under the vertical stage 350. The horizontal stage 340 supports the vertical stage 350, the roll positioner 330 and the DUT. The horizontal stage 340 is configured to translate the azimuth positioner 305, the vertical stage 350, the roll positioner 330 and the DUT in the X direction of the coordinate system of FIG. 3.

The vertical stage 350 is disposed above the horizontal stage 340 and is supported by the horizontal stage 340. The vertical stage 350 is configured to translate the roll positioner 330 and the DUT in the Y direction of the coordinate system of FIG. 3.

The combination of the X-direction capabilities of the horizontal stage 340 and the Y-direction capabilities of the vertical stage 350 replace the functionality of the linear positioner 120 in FIG. 1A and FIG. 1B and the linear positioner 220 in FIG. 2B and FIG. 2C.

The system 300A is adapted to operate by rotating (shown by arrow 352) the azimuth positioner 305 to rotate the DUT about the vertical azimuth (Y-direction of the coordinate system of FIG. 3), and rotating the roll positioner 330 about the horizontal roll axis (X-direction of the coordinate system of FIG. 3.

The DUT may be linearly positioned using the horizontal stage 340 and the vertical stage 350 before or after rotation of the azimuth positioner 305 and the roll positioner 330, so that an antenna array (e.g., antenna group A) of the DUT is centered in the quiet zone. However, antenna elements that are not centered at the center of the roll positioner 330 and the azimuth positioner 305 as shown by antenna group B in FIG. 3 will move out of the quiet zone as the DUT is rotated around an entire sphere. The active antenna elements may therefore be re-centered within the quiet zone using the linear positioner comprising the vertical stage 350 and the horizontal stage 340 for every sampling of the DUT sphere.

In FIG. 3, the system 300A keeps a probe antenna fixed while the DUT is rotated around an entire sphere. The probe antenna in the system 300A may sample the pattern of the DUT across the sphere. As an example, the DUT may be sampled at each longitude and every longitude on the sphere as the sphere is moved.

The manufacturer of the DUT may provide the system 300A with information as to the location of each antenna array in/on the DUT. A high-gain probe antenna may illuminate the antenna array in a relatively-small quiet zone. The antenna array may not be maintained within the quiet zone through all degrees of rotation unless active re-positioning of the active elements is carried out using the linear positioner 250 and horizontal stage 340.

The system 300A is configured to ensure that the quiet zone is centered on the active antenna array of the DUT. The system 300A is a roll-over-vertical-over-azimuth-over-transverse stage system. The system 300A does not impose additional weight of a linear positioner on the roll positioner 330, and can be manipulated to offset the DUT in the X and the Y direction to center the desired antenna elements within the quiet zone. While some antenna elements of the DUT may move out of the quiet zone if the DUT is to be rotated about the first azimuth axis or about the second roll axis, the DUT may be returned to the quiet zone using the horizontal stage 340 and the vertical stage 350.

The system 300A in FIG. 3 enables a reduction in size of the quiet zone so that less than all antenna elements in the DUT may be illuminated at any one time, and so that the illuminated antenna elements may include active antenna elements of an antenna array of the DUT without including at least some inactive antenna elements of an antenna array of the DUT at any one time. As noted above, the reduction in the needed number of antenna elements accorded by the present teachings allows the illumination on the smaller active DUT area to have greater power density while minimizing wasted illumination on the non-active DUT elements. The higher power density in the smaller test zone enables larger dynamic range in measurements for power-constrained DUTs. Again, as noted above, the smaller quiet zone beneficially results in a reduced path loss due to the reduced beam width. The beam width of the probe antenna used in the system 300A may be chosen to illuminate a DUT with a beam front of a defined size. The system 300A enables manipulation of the DUT so that the system 300A may center active elements of the antenna array of the DUT within the quiet zone of the system 300A, even as the DUT is manipulated.

FIG. 4A illustrates a direct far-field system (FFS) for a system for device-under-test (DUT) control, in accordance with a representative embodiment.

FIG. 4A shows a context in which systems from any of FIG. 1A, FIG. 1B, FIG. 2A, FIG. 2B, FIG. 3C, or FIG. 3 are contemplated for use. Various details and aspects of the DUT positioner of FIG. 4A are common to the representative embodiments of FIGS. 1A-3, and may not be repeated to avoid obscuring the description of the presently described representative embodiments.

In FIG. 4A, the feed/probe antenna 210 directly emits signals to the DUT in a far-field system. In FIG. 4A, the DUT is placed by a positioning system within a quiet zone with near-ideal plane waves such that the antenna elements in the DUT are tested under far-field conditions. The DUT is mounted to the positioning system within the quiet zone to find the radiation pattern across an entire sphere which is 4*π steradians.

In FIG. 4A, the electromagnetic fields of the beams from the probe antenna 410 are denoted by dotted lines, and have fronts that are spherical but which can be approximated as flat waves when the probe antenna 410 is far enough away from the DUT to meet the far-field distance criteria. The far-field distance for any particular instance of the probe antenna 410 is based on the size of the aperture at the DUT. If the diagonal aperture of the DUT is D, the far-field distance from the probe antenna 410 to the DUT is two times D squared over lambda ($(2*D^2)/\lambda$), where lambda is the wavelength of operation. At higher frequencies, the size of the test facility that includes the probe antenna 410 may become larger than practicable.

FIG. 4B illustrates a compact antenna test range (CATR) for a system for device-under-test (DUT) control, in accordance with a representative embodiment.

FIG. 4B shows a context in which systems from any of FIG. 1A, FIG. 1B, FIG. 2A, FIG. 2B, FIG. 2C, FIG. 3A or FIG. 3B can be used. In FIG. 4B, the feed/probe antenna 210 directly emits signals to a parabolic reflector 490 that reflects the signals to the DUT in a compact antenna test range (CATR).

In FIG. 4B, the DUT is again placed by a positioning system within a quiet zone with near-ideal plane waves such that the antenna elements in the DUT are tested under far-field conditions. The DUT is mounted to the positioning system within the quiet zone to find the radiation pattern across an entire sphere which is 4*π steradians. In FIG. 4B, the quiet zone may extend along the negative Z-axis beyond the DUT since the beam is collimated by the parabolic reflector 490. The CATR is an alternative to the DFF system, and uses a parabolic reflector 490 to create flat fronts at the focal plane of the parabolic reflector 490 as shown. Aa a result, the probe antenna 410 emits spherical fields to the focus of the parabolic reflector 490, and spherical fields are reflected back to the focal plane as flat fields. The translation from parabolic to flat in the CATR may be independent of frequency, so that the CATR can be used with a large set of bandwidths to create the semi ideal-far-field test conditions in a smaller room size, i.e., a smaller chamber.

FIG. 5 illustrates switching between DUT antenna arrays in a system for device-under-test (DUT) control, in accordance with a representative embodiment. As an example, the first controller 109 may include at least a memory that stores instructions and a processor that executes the instructions to control the first motor 107 systematically in a test pattern.

FIG. 5 illustrates a DUT with a first antenna array A and a second antenna array B. In FIG. 5, the first antenna array A and the second antenna array B in the DUT are separate and independent antenna arrays. As shown, the DUT can be manipulated in the X direction (e.g., along arrow 502) and the Y direction (e.g., along arrow 504) to center active elements of the first antenna array A and the second antenna array B in a quiet field of a system at separate times. In the left of FIG. 5, the first antenna array A is positioned within the quiet zone, and in the right of FIG. 5, the second antenna array B is positioned within the quiet zone. As an example, the linear translation in the horizontal direction and the vertical direction may be implemented using the linear positioner 220 in FIG. 2B and FIG. 2C.

Figure 6:
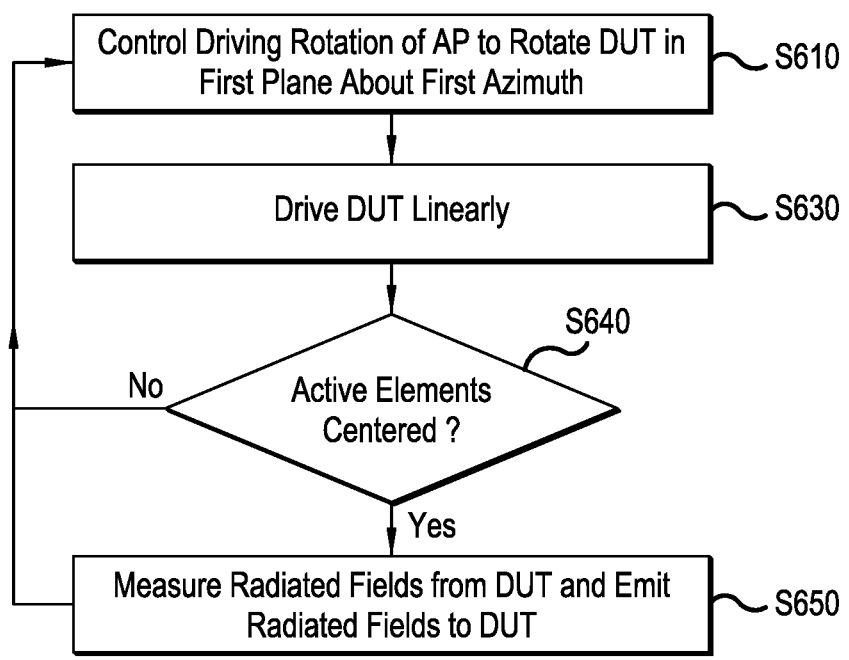
FIG. 6 illustrates a method for device-under-test (DUT) control, in accordance with a representative embodiment.

FIG. 6 illustrates a method for device-under-test (DUT) control, in accordance with a representative embodiment. The method is contemplated to be implemented by the execution of instructions stored in a memory by a controller that comprises a processor. Notably, the illustrative method is implemented using a controller described above, which executes instructions stored in memory to effect movement by various motors to carry out the various aspects of the method.

The method of FIG. 6 starts at S610 by controlling driving rotation of an azimuth positioner to rotate a DUT in a first plane about a first azimuth.

At S620, the DUT is driven linearly by a linear positioner.

At S630, a determination is made as to whether active elements of an antenna array are centered.

At S640, the method of FIG. 6 includes controlling driving rotation of the azimuth positioner to rotate the DUT in a second plane about a second roll axis.

If the active elements of the antenna array are centered (S630=Yes), the method of FIG. 6 includes measuring radiated fields from the DUT and emitting radiated fields to the DUT in a test.

If the active elements of the antenna array are not centered (S630=No), or otherwise after measuring radiated fields from the and emitting radiated fields to the DUT in a test, the method of FIG. 6 returns to S610.

The method of FIG. 6 may be performed iteratively by moving the DUT in a test pattern until all required measurements and emissions at S650 are performed for the DUT at distinct positions in the test system.

Figure 7:
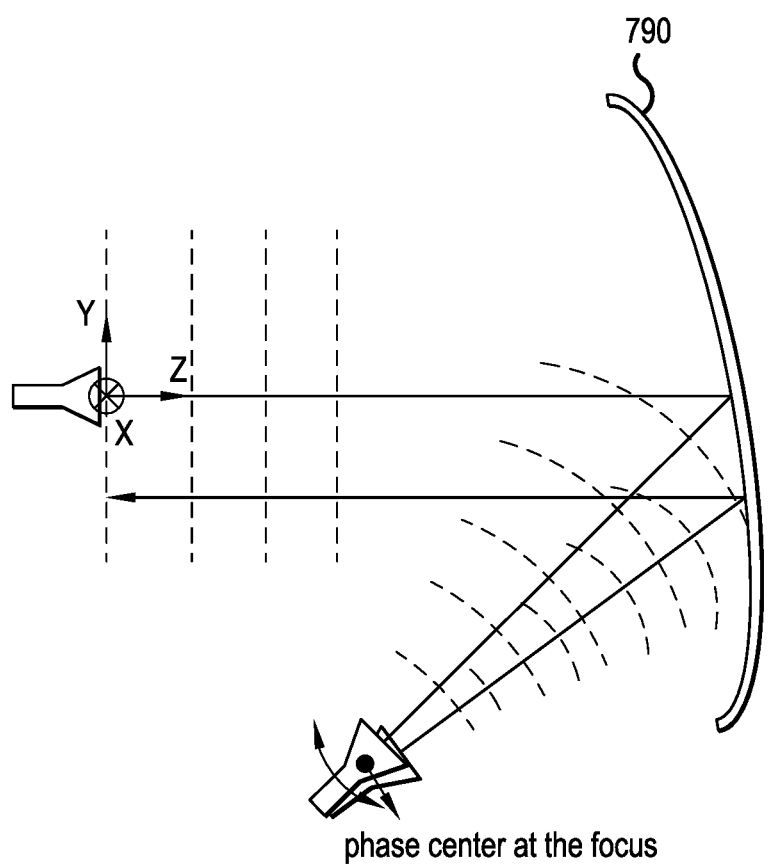
FIG. 7 illustrates another system for probe control in device-under-test (DUT) measurements in accordance with a representative embodiment.

FIG. 7 illustrates another system for device-under-test (DUT) control, in accordance with a representative embodiment.

In FIG. 7, a pointing angle of a probe antenna is adjusted to center the quiet zone over any active antenna elements in the DUT without moving the aperture of the probe antenna from the focus of an intervening parabolic reflector 790. As long as the aperture of the probe antenna is centered at the focus of the intervening parabolic reflector 790, the incoming angle of the collimated beam on the DUT will not change. The probe antenna may be rotated to track active antenna elements in an antenna on the DUT by adjusting a pointing angle of the probe antenna, and this may be done without otherwise displacing the probe antenna.

The peak amplitude of the beam is offset on the DUT by an amount related to the pointing angle of the probe antenna, as well as the amplitude tapering effects of the intervening parabolic reflector 790. The approach shown in FIG. 7 may not maintain the offset antenna elements within the offset quiet zone as a positioner system is rotated across a first azimuth provided by an azimuth positioner and a second roll of a roll positioner. However, a controller (not shown in FIG. 7) may be used to track the rotation of the offset antennas by adjusting the pointing angle of the probe antenna appropriately. In some embodiments, a test plan that involves rotating an offset antenna of the DUT using an azimuth positioner and a roll positioner may also coordinate rotation of the probe antenna to account for the rotation of the offset antenna of the DUT. In other embodiments, the rotation of the offset antenna of the DUT may be tracked and fed back to a controller and used to control rotation of the probe antenna.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, device-under-test (DUT) control enables enhanced maintenance of a DUT within a quiet zone of a test system for testing DUTs.

Although device-under-test (DUT) control has been described with reference to several exemplary embodiments, it is understood that the words that have been used are words of description and illustration, rather than words of limitation. Changes may be made within the purview of the appended claims, as presently stated and as amended, without departing from the scope and spirit of device-under-test (DUT) control in its aspects. Although device-under-test (DUT) control has been described with reference to particular means, materials and embodiments, device-under-test (DUT) control is not intended to be limited to the particulars disclosed; device-under-test (DUT) control extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

We claim:

1. A system for testing a device-under-test (DUT) over-the air (OTA), the system comprising:
a probe antenna configured to measure radiated fields from the DUT in a transmit test and to emit radiated fields to the DUT in a receive test by radiating electromagnetic waves upon active antenna elements of the DUT;
a rotational positioner configured to rotate the DUT about one or more orthogonal axes; and
a linear positioner configured to drive the DUT linearly along a first Y-axis and configured to drive the DUT linearly along a second X-axis perpendicular to the first Y-axis to stay within a quiet zone of the system.

2. The system of claim 1, wherein the rotational positioner comprises an azimuth positioner and a roll positioner.

3. The system of claim 2, wherein the linear positioner is mounted between the DUT and the rotational positioner and is adapted to move the DUT linearly along a first Y axis and a second X axis.

4. The system of claim 2, further comprising:
a first motor configured to drive a rotation of the azimuth positioner;
a second motor configured to drive a rotation of the roll positioner; and
a controller configured to control the first motor to drive rotation of the azimuth positioner and configured to control the second motor to drive rotation of the roll positioner.

5. The system of claim 4, further comprising:
a third motor configured to drive the linear positioner between the DUT and the rotational positioner adapted to drive the DUT linearly along the first Y-axis and along the second X-axis, wherein the controller is configured to control the third motor to drive the linear positioner to drive the DUT along the first Y-axis and along the second X-axis.

6. The system of claim 1, wherein the system is configured to center active elements of an antenna or antenna array of the DUT within the quiet zone of the system.

7. The system of claim 1, wherein:
the DUT comprises one or more antennas or antenna arrays; and
the system is configured to center first active elements of the first antenna array of the DUT within the quiet zone at a first time and second active elements of the second antenna array within the quiet zone at a second time.

8. The system of claim 7, wherein the one or more antenna or antenna arrays are physically separated from each other.

9. The system of claim 1, wherein:
linear positioner comprises a first linear positioner and a second linear positioner; the first linear positioner is mounted under the azimuth positioner and parallel to wave fronts of a beam from the probe antenna; and the second linear positioner is mounted over the azimuth positioner and perpendicular to the first linear positioner.

10. The system of claim 1, further comprising: a parabolic reflector configured to collimate a diverging beam from the probe antenna.

11. The system of claim 1, wherein the system is configured to illuminate less than all antenna elements in the DUT at any one time during the transmit test and during the receive test.

12. The system of claim 1, wherein the one or more orthogonal axes comprise an azimuth axis, an elevation axis or a roll axis.

13. A method for testing a device-under-test (DUT) over-the air (OTA), the method comprising:
measuring radiated fields from the DUT in a transmit test;
radiating radiated fields to the DUT in a receive test by illuminating active antenna elements of the DUT;

rotating the DUT in a first plane about an azimuth axis;

driving the DUT linearly along a first Y-axis in a second plane orthogonal to the first plane and the DUT linearly along a second X-axis perpendicular to the first Y-axis in the second plane, to stay within a quiet zone; and rotating the DUT about a roll axis orthogonal to the azimuth axis, wherein the rotating the DUT about the azimuth axis is performed by an azimuth positioner and rotating the DUT about the second roll axis is performed by a roll positioner, and the azimuth positioner and the roll positioner are together configured to rotate the DUT across $4*\pi$ steradian.

14. The method of claim 13, further comprising:

driving rotation of an azimuth positioner;

driving rotation of a roll positioner; and controlling a first motor to drive rotation of the azimuth positioner and a second motor to drive rotation of the roll positioner.

15. The method of claim 14, further comprising:

driving, by a third motor, a linear positioner to drive the DUT linearly in the second plane along the first Y-axis and along the second X-axis, and controlling, by the controller, the linear positioner to drive the DUT linearly in the second plane along the first Y-axis and along the second X-axis.

16. The method of claim 13, further comprising:

centering active elements of an antenna array of the DUT within the quiet zone.

17. The method of claim 13, wherein:

the DUT comprises one or more antennas or antenna arrays, where one or more antenna or antenna arrays are physically separated from each other; and the method further comprises:

centering first active elements of the first antenna array of the DUT within the quiet zone at a first time and second active elements of the second antenna array within the quiet zone at a second time.

18. A system for testing a device-under-test (DUT) over-the air (OTA), the system comprising:

a probe antenna configured to measure radiated fields from the DUT in a transmit test and to emit radiated fields to the DUT in a receive test by radiating electromagnetic waves upon active antenna elements of the DUT;

a rotational positioner configured to rotate the DUT about any two orthogonal axes to rotate the DUT across $4*\pi$ steradians; and a linear positioner configured to drive the DUT linearly along a first Y-axis and configured to drive the DUT linearly along a second X-axis perpendicular to the first Y-axis to stay within a quiet zone of the system.

19. The system of claim 18, wherein the rotational positioner comprises an azimuth positioner and a roll positioner.

20. The system of claim 18, wherein the DUT comprises one or more antennas or antenna arrays; and the system is configured to center first active elements of the first antenna array of the DUT within the quiet zone at a first time and second active elements of the second antenna array within the quiet zone at a second time.

\* \* \* \* \*